United States Patent [19]
Shier

[11] 3,919,259

[45] Nov. 11, 1975

[54] PREPARATION OF PHENYLMALEIC ANHYDRIDE

[75] Inventor: George D. Shier, Midland, Mich.

[73] Assignee: The Dow Chemical Company, Midland, Mich.

[22] Filed: Mar. 21, 1974

[21] Appl. No.: 453,469

[52] U.S. Cl.................................. 260/346.8; 264/386.8
[51] Int. Cl.²................................................ C07D 307/89
[58] Field of Search...................... 260/346.8, 346.4

[56] References Cited
UNITED STATES PATENTS

| | | | |
|---|---|---|---|
| 2,574,512 | 11/1951 | Toland, Jr. | 260/346.4 |
| 3,000,908 | 9/1961 | Ruthruff | 260/346.4 |
| 3,704,251 | 11/1972 | Vrbaski et al. | 260/346.8 |

*Primary Examiner*—Henry R. Jiles
*Assistant Examiner*—Bernard I. Dentz
*Attorney, Agent, or Firm*—Glwynn R. Baker

[57] ABSTRACT

In the vapor phase oxidation of biphenyl or sec-butylbenzene by molecular oxygen over a vanadium oxide catalyst to make phenylmaleic anhydride, both the conversion of hydrocarbon and the yield of anhydride are increased by adding a small amount of $SO_2$ or other sulfur oxide to the gaseous feed stream. Phenylmaleic anhydride is a valuable monomer useful for making moldable polymers.

5 Claims, No Drawings

PREPARATION OF PHENYLMALEIC ANHYDRIDE

BACKGROUND OF THE INVENTION

The present invention relates to an improvement in a known chemical process. It relates more particularly to an improvement whereby greater and more efficient production of phenylmaleic anhydride is obtained from the vapor phase oxidation of an appropriate aromatic hydrocarbon.

It is known that phenylmaleic anhydride can be produced as the major product of the catalytic vapor phase oxidation of biphenyl or sec-butylbenzene. Such a process using a vanadium oxide catalyst has been described by Vrbaski et. al., U.S. Pat. No. 3,704,251. In that process, a mixture of the vapor of biphenyl or sec-butylbenzene and air or other molecular oxygen-containing gas is contacted with a catalyst containing a vanadium oxide as the essential component. Preferably, as described in the patent, the catalyst also contains potassium sulfate as a promoter and the catalytic components may be deposited on a support such as corundum, silica gel, pumice, or the like. The oxidation process itself is carried out at about 350°–480°C. using a feed stream of about 0.2–1% by volume of hydrocarbon in air or similar oxygen-containing gas, corresponding to a ratio of about 20–100 moles of oxygen per mole of hydrocarbon. High conversions of hydrocarbon feed are obtained by this process and substantial amounts of phenylmaleic anhydride are found in the product. However, the process also produces substantial quantities of by-products such as benzoic acid, phthalic anhydride, maleic anhydride, and carbon oxides so that the overall efficiency of the process is low.

SUMMARY OF THE INVENTION

It has now been found that in the abovedescribed oxidation process, considerable improvement in the yield of phenylmaleic anhydride is obtained by incorporating in the feed stream about 0.01–0.1 mole of a sulfur oxide per mole of aromatic hydrocarbon. Preferably, the sulfur oxide is $SO_2$ although $SO_3$ and other sulfur oxides can also be employed. In the sulfur oxide-modified oxidation, the practically operable temperature limits are about 325°–450°C., somewhat lower than in the Vrbaski process.

DETAILED DESCRIPTION

Although the sulfur oxide component is most conveniently added to the process feed as sulfur dioxide, substantially the same result is obtained with $SO_3$ or other sulfur oxide as noted above or with sulfur in any suitable form which is oxidized to $SO_2$ or $SO_3$ under the process conditions. Thus, sulfur vapor, $H_2S$, COS, and volatile organic sulfur compounds such as mercaptans, sulfides, thioketones, thioacids, sulfones, sulfoxides, $CS_2$, and other such compounds containing only carbon, hydrogen, and oxygen in addition to sulfur are all equivalent to $SO_2$ in this reaction.

The aromatic hydrocarbon is preferably biphenyl but sec-butylbenzene gives essentially the same result. 2-Butenylbenzene and 2-phenylbutadiene are regarded as chemical equivalents of sec-butylbenzene for the purpose of this process although these compounds are usually not economically practical. Since the explosive limit of biphenyl or sec-butylbenzene in air is about 0.7 volume percent, a preferred biphenyl-air-$SO_2$ feed mixture contains about 0.1–0.7 volume percent hydrocarbon.

The preferred temperature for the improved oxidation process is in the approximate range of 350°–375°C. At low temperatures, conversion is low and at high temperatures, selectivity or yield of phenylmaleic anhydride is reduced, other conditions being equal.

The contact time or time during which a volume of feed is in contact with the catalyst bed can range from about 0.1 second to about 5 seconds. The preferred contact time is about 0.2–0.5 second.

The process is customarily run at atmospheric or near atmospheric pressure. Higher pressures may be used but are ordinarily of no substantial advantage.

Although substantially any vanadium oxide oxidation catalyst can be used in the process, either fixed bed or fluid catalyst, supported or unsupported, best results have been found with vanadia catalysts containing potassium sulfate as a promoter or modifying additive. Particularly efficient catalysts have been made by precipitation whereby a potassium silicate solution is gelled either by addition of sulfuric acid with later addition to the soft gel of an aqueous vanadium compound such as ammonium vanadate or by addition of the vanadium compound solution first with later acidification by sulfuric acid. By such methods, high surface area catalysts are obtained which, after activation by roasting, consist essentially of silica gel uniformly impregnated with vanadia with a substantial proportion of potassium sulfate also present. Such catalysts may also be made to contain minor amounts of silver oxide, cerium oxide or a mixture thereof as a modifying additive as taught in U.S. Pat. No. 2,698,330. Preferred catalysts of the above type typically contain about 3–25% vanadium oxide, usually $V_2O_5$, about 20–50% potassium sulfate, and up to 5% silver oxide or cerium oxide, all based on the calcined weight of the supported catalyst.

The phenylmaleic anhydride component of the product is readily recovered by fractional distillation of the condensed effluent. It is a useful comonomer for making moldable copolymers analogous to the known copolymers of maleic anhydride. A particular advantage of this improved process is that essentially no phthalic anhydride is produced as a by-product.

EXAMPLES

Catalyst Preparation

A high surface area supported vanadium oxide catalyst was prepared essentially as shown in U.S. Pat. No. 2,973,371 by adding 244 g. of a potassium silicate solution (20.8% $SiO_2$, 8.3% $K_2O$) to 528 ml. of water, heating the resulting solution to 60°C. and adding 10 g. of $NH_4VO_3$ in portions to form a solution which became milky and then gelled. The gel was broken up and stirred for about 40 minutes at 60°C. Then 172 g. of 24% $H_2SO_4$ was added in portions alternating with portions of concentrated ammonium hydroxide to maintain the pH of the reaction mixture at about 9 while stirring was continued. A final addition of 5 g. concentrated $H_2SO_4$ had little effect on the pH. The gel was concentrated in a vacuum evaporation at 60°C. and then dried overnight at 115°C. The product was ground to pass an 80 mesh screen. This powder was compressed into pellets which were then broken up into 8–12 mesh and 12–20 mesh fractions for use as catalyst A.

A similar catalyst was made up essentially as described in U.S. Pat. No. 2,698,330 by diluting 475 g. of the same potassium silicate solution with a liter of water, adding 538 g. of 13.9% aqueous $H_2SO_4$ at 43°C. with vigorous stirring, and then adding 80 ml. of concentrated ammonium hydroxide to a final pH of 8–9, thereby forming a gel which necessitated a stronger stirrer. The gel was stirred for a half hour while it was heated to 70°C. and a solution of 28 g. $NH_4VO_3$ in 450 ml. of water at 100°C. was added with continued stirring. After one hour of stirring at 70°–80°C., the gel was concentrated at 60 mm. Hg. in a vacuum evaporator to remove about 60% of the water. The partially dried gel was then dried 2 days at 115°C., ground, pelleted, and broken up as for catalyst A to obtain a granular solid designated as catalyst B.

Oxidation Procedure

Experimental oxidations were carried out using a bed of about 30 ml. catalyst granules in a high silica glass tube of about 19 mm. outside diameter having a concentric glass thermocouple well of 6 mm. diameter. The tube containing the catalyst bed was immersed in a bath of molten mixed salts and a preheated feed stream of 0.04 g. biphenyl vapor per liter of air was passed through the catalyst bed at the indicated temperature and space velocity. The effluent gases passed into an ice-cooled flask for condensation of the higher boiling components and out through glass wool packing to remove entrained solids. Product samples were collected by contacting the flask and packing with boiling acetone and the resulting solutions were analyzed directly by gas chromatography. From the data thereby obtained, there were calculated the percent of the biphenyl feed converted to other products and the yield of phenylmaleic anhydride as the percent of converted biphenyl oxidized to that compound.

These results are found in the tables below which list the data from experiments in which the catalyst bed temperature, $SO_2$ concentration in the feed, and the feed space velocity were varied. The space velocity was calculated as volumes of feed gas at standard conditions per volume of catalyst bed per hour. Catalyst A was used in the experiments reported in Tables 1 and 2. The feed stream was 40 mg. biphenyl vapor per liter of air, with and without added $SO_2$ as noted.

TABLE 1

| (Runs made at constant space velocity 3000) | | | % Yield | | |
|---|---|---|---|---|---|
| Temp.°C. | ppm $SO_2$ | % Conversion | PMA | MA | BA |
| 350 | 0 | 28 | 39 | 6 | 24 |
| 350 | 100 | 32 | 65 | 5 | 20 |
| 350 | 250 | 27 | 54 | 4 | 15 |
| 375 | 0 | 39 | 39 | 9 | 22 |
| 375 | 100 | 62 | 46 | 11 | 22 |

TABLE 1-continued

| (Runs made at constant space velocity 3000) | | | % Yield | | |
|---|---|---|---|---|---|
| Temp.°C. | ppm $SO_2$ | % Conversion | PMA | MA | BA |
| 375 | 250 | 58 | 44 | 8 | 20 |

PMA = phenylmaleic anhydride
MA = maleic anhydride
BA = benzoic acid

TABLE 2

| (Runs made at constant 100 ppm $SO_2$) | | | % Yield | | |
|---|---|---|---|---|---|
| Temp.°C. | Space Velocity | % Conversion | PMA | MA | BA |
| 350 | 2000 | 46 | 54 | 8 | 24 |
| 350 | 3000 | 32 | 65 | 5 | 20 |
| 350 | 4000 | 23 | 69 | 3 | 17 |
| 375 | 3000 | 62 | 46 | 11 | 22 |
| 375 | 4000 | 52 | 52 | 8 | 19 |
| 375 | 5000 | 46 | 56 | 6 | 18 |

Using the same apparatus and operating procedure as described above, a bed of catalyst B was tested with and without $SO_2$ in the feed stream. The figures for conversion and yield listed in Table 3 were obtained by analyzing product samples taken at 268 hours and 338 hours respectively of of operation at a space velocity of 3000 and other conditions as defined.

TABLE 3

| | | | % Yield | | |
|---|---|---|---|---|---|
| Temp.°C. | ppm $SO_2$ | % Conversion | PMA | MA | BA |
| 350 | 0 | 34 | 38 | 3 | 20 |
| 350 | 100 | 48 | 50 | 5 | 20 |

In the experiments described above, similar results are obtained when an equivalent quantity of sec-butylbenzene is substituted for the biphenyl in the feed stream.

I claim:

1. In the process for making phenylmaleic anhydride by contacting a gaseous mixture of an aromatic hydrocarbon which is biphenyl or sec-butylbenzene and a molecular oxygen-containing gas with a vanadia catalyst at about 325°–450°C., the improvement wherein said mixture contains about 0.01–0.1 mole of a sulfur oxide per mole of aromatic hydrocarbon.

2. The process of claim 1 wherein the aromatic hydrocarbon is biphenyl and the sulfur oxide is $SO_2$.

3. The process of claim 2 wherein the vanadia catalyst is a silica gel uniformly impregnated with about 20–50% by weight of potassium sulfate and about 3–25% of a vanadium oxide.

4. The process of claim 2 wherein the oxygen-containing gas is air.

5. The process of claim 4 wherein the biphenyl-air-$SO_2$ mixture contains about 0.1–0.7 volume percent of biphenyl vapor.

* * * * *